3,472,697
HIGH TEMPERATURE FUEL CELL
Gerd Sandstede, Frankfurt am Main, Arnold Isenberg, Neu-Isenburg, and Wilfried Pabst, Frankfurt am Main, Germany, assignors to Battelle-Institut e.V., Frankfurt am Main, Germany
Filed Oct. 4, 1966, Ser. No. 584,241
Claims priority, application Germany, Oct. 8, 1965, D 84,032
Int. Cl. H01m 27/12
U.S. Cl. 136—86                                    4 Claims

ABSTRACT OF THE DISCLOSURE

An aggregate of galvanic fuel cells for operation with a gas fuel and a gas oxidant at elevated temperatures including a plurality of closely spaced superposed solid electrolyte disc-shaped layers, each being provided at each side with a thin layer gas-permeable electrode, a plurality of stays of the same electrolyte material for supporting and spacing the disc-shaped layers and forming a unitary structure having gas-tight chambers between the disc-shaped layers, the disc-shaped layers having a thickness of about .1 to 1 mm. and the stays having a height of about .1 to 2 mm., and means for introducing the gas fuel and the gas oxidant to alternate ones of the chambers.

---

This invention relates to a galvanic fuel cell operated with a gaseous fuel and an oxidizing agent like oxygen or air at high temperatures and using a solid electrolyte.

High temperature fuel cells use electrolytes consisting of molten salts, or solids which are suitable as electrolytes by reason of their high ion mobility and negligible electronic conductivity. Such an electrolyte is represented, e.g., by the cubic phase of zirconium oxide which has fluorite structure. The oxygen ions in the fluorite lattice of the zirconium oxide migrate at high temperature in the electric potential gradient while the cations remain at their lattice points.

If electrodes are applied to both sides of a thin zirconium oxide disc and the electrode spaces are sealed against each other, such assembly constitutes a galvanic fuel cell when, e.g., hydrogen as gaseous fuel is fed into the one electrode space and oxygen as oxidizing agent into the other electrode space. On short circuiting the electrodes, there flows a current whose intensity depends primarily on the electrode surface, the electrolyte resistance, and the electrode material.

For the construction of a cell or battery, the solid electrolyte can be employed in the form of tubes (R. L. Zahradnik et al., Fuel Cell Systems, Advances in Chemistry Series No. 47, American Chemical Society, Wash., D.C., 1965, p. 337) or discs (H. Binder et al., Electrochimica Acta, London, vol. 8, p. 781–793, 1963). As the sealing problem is more difficult for disc electrodes than for tubular electrodes, the latter have been preferably used in the construction of cells. The sealing of cells with tubular electrolyte can take place in cooler zones though this diminishes the power density of the cell. When using disc electrolytes, anode and cathode space must be sealed in the high temperature zone; this is very difficult and requires expensive sealing materials such as gold.

If the operating temperature of the fuel cell is below 1000° C., the electrolyte resistance is relatively high, and attempts have been made, among others, to reduce the thickness of the electrolyte. Electrolyte layers have been prepared by flame spraying (E. V. Schultz et al., American Gas Journal, vol. 188 (1961), May issue, pp. 24–32). However, such layers are brittle and easily breakable and, therefore, can hardly be used without a carrier. In tubular electrolytes, the wall thickness is about 1 mm. if sufficient mechanical strength is required.

It is a principal object of the invention to provide a novel construction of solid electrolyte which does not have the recited drawbacks.

Other objects and advantages will be apparent from the specification and claims.

In the description of the invention, reference will be had to the accompanying drawings wherein.

Figure 1:
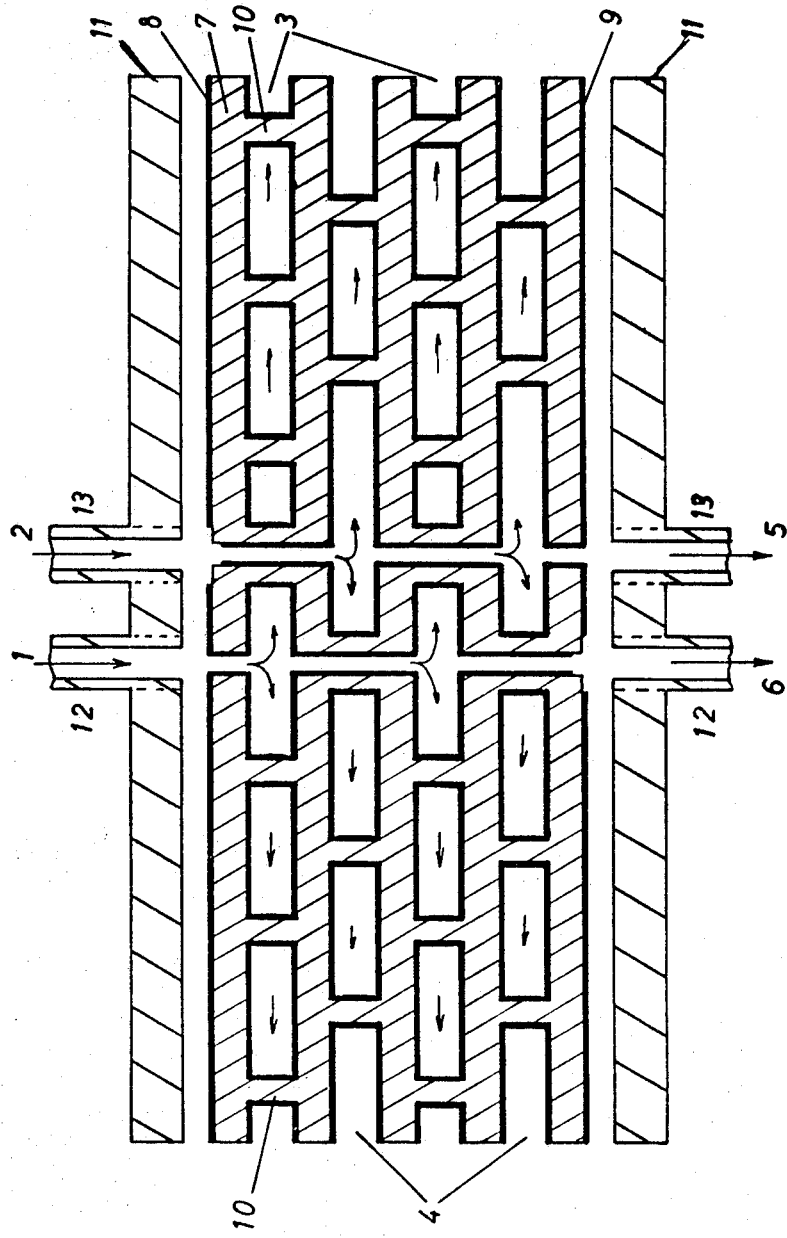
FIG. 1 is a longitudinal sectional view of a fuel cell aggregate according to the invention in which the fuel gas and the oxidant gas flow from the inside towards the outside.

Referring first to FIG. 1 of the drawings, the reference numerals 1 and 2 designate gas inlets, and 6 and 5 outlets for the not consumed gases. 3 and 4 are exit ports for the combustion products. 7 is the densely sintered electrolyte, whose surfaces have been polished before the electrodes 8 and 9 are applied. Plan-polished metal discs 11 are pressed against the faces of the cells and are provided with gas nipples 12, 13 in such a way that the gas inlets and outlets are opposite the bores of the cells. One of the metal discs serves as contact for the electrode 8 while the other contacts electrode 9.

The small electrolyte layers are supported by small stays or posts 10 of sintered electrolyte material. For the sake of clarity, only a small number is shown. The number and dimensions of said stays 10 is so adjusted as to withdraw only a small area (about 5%) of the total electrode surface.

Figure 2:
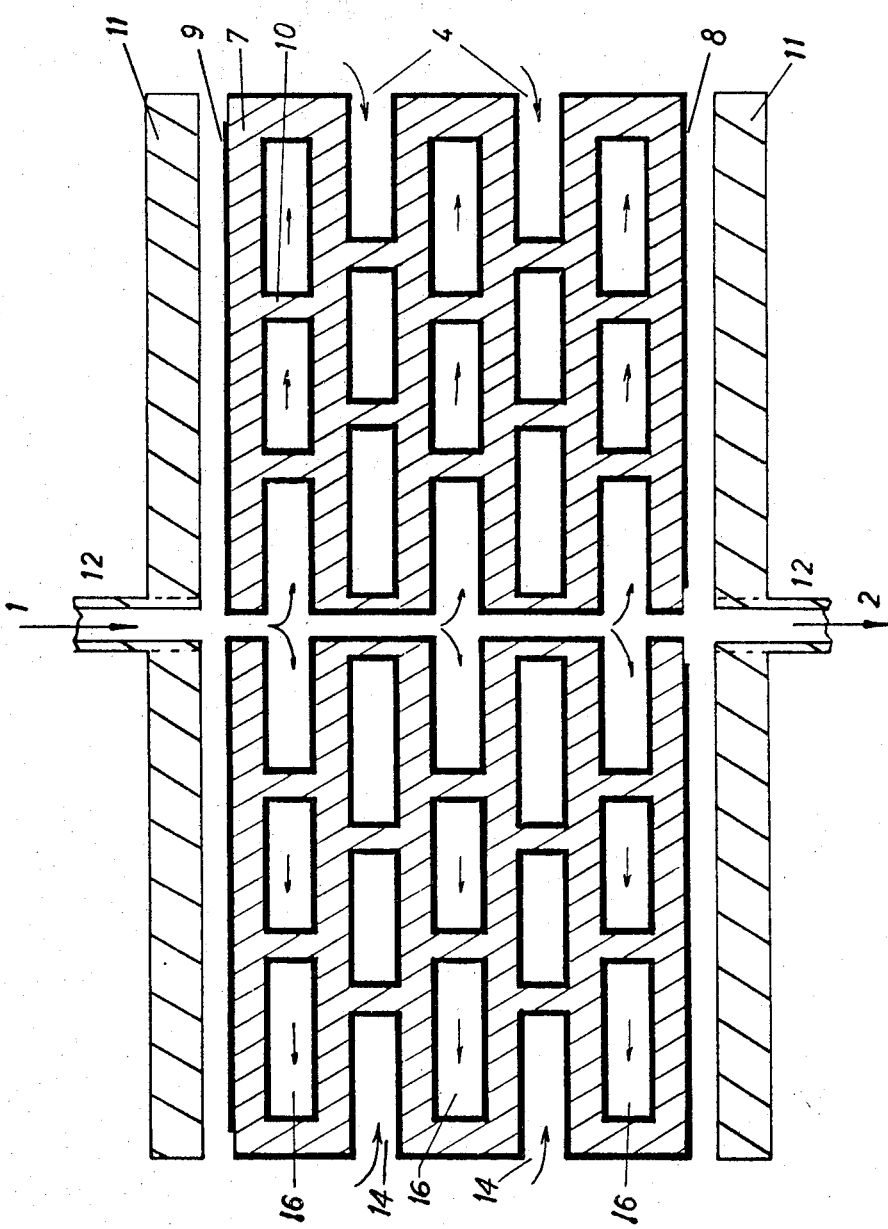
FIGS. 2 and 3 are similar views of other embodiments of the invention.

In FIG. 2, which illustrates a cell element whose electrode spaces are separated from each other, one of the gases flows into the chamber 16 while the other gas fills the spaces 14.

The present invention resides in the superposed assembly of closely spaced electrolyte discs whose thickness has been strongly reduced (to a thickness from 1 mm. to about 0.1 mm.) and which carry at both sides thin layer gas permeable electrodes and which form a unitary structure by means of stays composed of the same material. The distance between the discs should be in the range of about 0.1 to 2 mm.

It is surprising that the arrangement according to the invention ensures a mechanically very stable cell construction in spite of the extreme thinness of the electrolyte layers. Such cell aggregate comprises a plurality of parallelly connected cells. The sealing problems are restricted to a minimum. Our galvanic fuel cell allows, due to its construction, of attaining power densities which with comparable arrangements cannot be reached because of the thicker electrolyte layers. The novel cell arrangement is readily obtained by pressing, sintering and subsequent application of the electrodes, e.g., by impregnation.

We will describe first the preparation of a cell element, with reference to FIG. 2.

Figure 5:
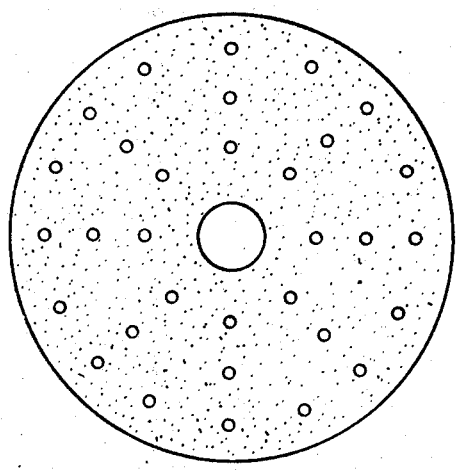
FIGS. 4 and 5 show elements of the fuel cells in various stages of their construction.
Figure 4:
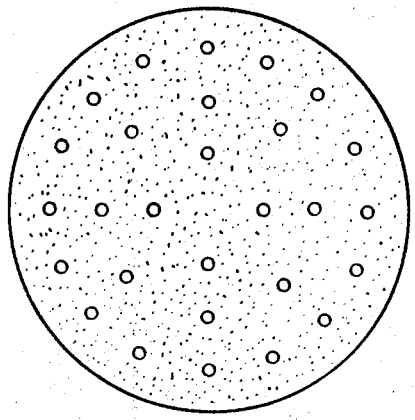

A ram is introduced into the sleeve of a die of 24 mm. diameter. On said ram, we distribute a measured quantity of electrolyte powder (about 0.3 g). Said powder layer is covered centrically with an ash-free paper of 22 mm. diameter and 0.2 mm. thickness, into which small holes of 0.5 mm. diameter have been punched (see FIG. 4). The paper is applied with moderate pressure and again sprinkled with a measured quantity of the electrolyte powder. Said layer is covered with a paper disc which has a diameter of 24 mm. and a thickness of 0.2 mm. and which is provided with holes as shown in FIG. 5. By alternating paper discs and electrolyte layers, we obtain a pressed disc of about 0.5 cm. thickness by using 10 to 12 electrolyte layers and compressing the entire assembly under a pressure of 5 long tons/cm.$^2$. After pressing, the holes of the paper sheets are filled with electrolyte powder and form, after burning the paper and sintering the electrolyte, dense stays 10 which prop the thin electrolyte discs against each other. Prior to the burning of the paper, the tablets are pieced vertically and centrally. The diameter of the bore is about 1.5 mm., while the diameter of the central hole of the paper disc of FIG. 5 is 3 mm. Therefore, a dense rim around the bore is produced in the area of the electrode spaces 14 (FIG. 2) while the bore goes through the electrode spaces 16.

After having been sintered at 1800° C., the electrolyte body is provided by vacuum impregnation with electrode forming pastes which after baking at elevated temperature leave metal layers on the electrolyte.

Figure 3:
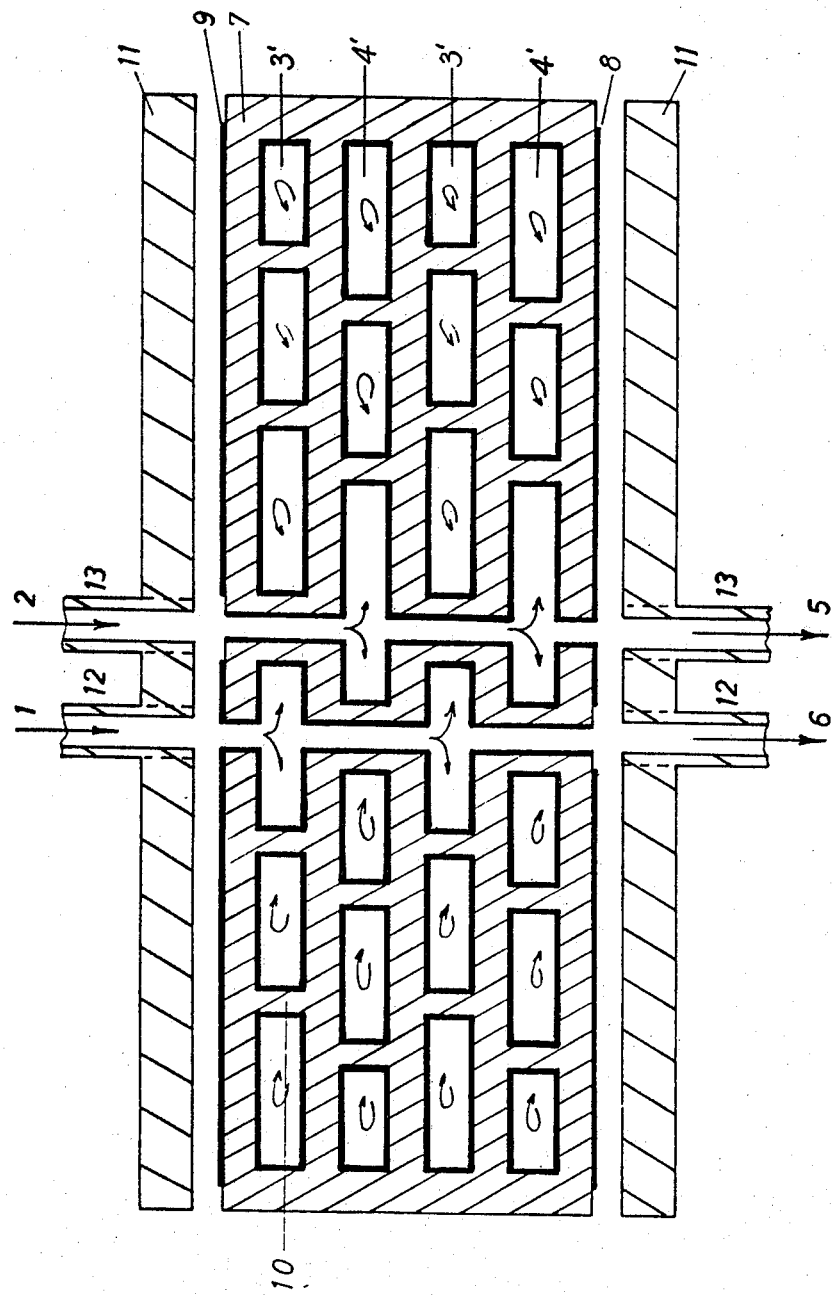

The methods used for making the embodiments of FIGS. 1 and 3 are, disregarding small variations like the arrangement of the holes and diameter of the paper discs, essentially the same as set forth with respect to FIG. 2.

In the following examples, the embodiments of the invention illustrated in the drawing are described, and their functions are described more in detail.

EXAMPLE 1

In the cell of FIG. 1, the fuel gas and oxidant gas are introduced at elevated temperatures at 1 and 2; and the combustion gases, as e.g., water vapor and/or carbon dioxide, on the one hand, and excess oxygen and nitrogen (if air is used as oxidant gas) on the other hand, are withdrawn at 3 and 4 into the waste gas space. Small unconsumed quantities of the fuel gas are completely burned in the waste gas space, and the combustion heat can be used to compensate for the heat loss of the aggregate.

A battery of such cell aggregates allows of producing at 900° C. a power density of about 3 kw./liter when an electrolyte is selected which has at said temperature a specific resistance of 20Ω·cm. Such an electrolyte consists, e.g., of 92 mole percent of zirconium oxide and 8 mole percent of yttrium oxide. The thickness of the electrolyte layers must be 0.25 to 0.30 mm., that of the electrode spaces 0.2 to 0.25 mm. At said thickness of the electrolyte layers and when using hydrogen as fuel gas and air as oxidant gas, there is obtained a current density of 0.5 a./cm.$^2$ at 0.7 v. This results in a power density of about 5.5 kw. per liter of aggregate volume. If a 50% space utilization of the cell aggregate in the battery is assumed the above figure of 3 kw./liter is obtained. If the volumetric weight of the battery is taken as 3 kg./liter, the weight per unit of power obtained is 1 kg./kw.

EXAMPLE 2

In a cell assembled from elements as shown in FIG. 2, the fuel gas enters at 1, passes from one residence chamber 16, where the electrochemical reaction takes place, to the next and so on, thereby becomes enriched with combustion products, and flows out at 2. The oxidant gas surrounds the cell and fills the cathode spaces. It is, of course, also possible to have the fuel gas surrounding the element and the oxidant gas enter at 1 and flow out at 2.

EXAMPLE 3

The operation of the cell assembly shown in FIG. 3 will be readily understood from Examples 1 and 2. The two electrode spaces are separate from each other; the gases enter at 1 and 2, collect in residence chambers 3' and 4', where the electrochemical processes take place, and flow out at 5 and 6.

EXAMPLE 4

Figure 7:
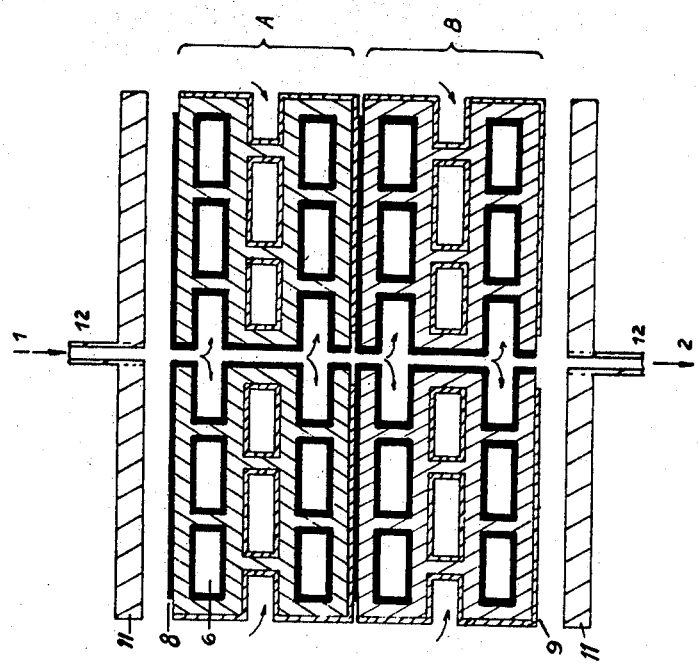
FIGS. 6 and 7 illustrate cell aggregates assembled from series-connected cell elements as shown in FIGS. 1–3.

Cell aggregates as shown in FIG. 2 are connected in series as shown in FIG. 7.

The fuel gases enter the cell element A at 1, are reacted therein with the oxidant gas, and pass through element B and further elements (not shown) until the combustion is completed. As the front surfaces of the cell aggregates are coated alternately with cathode and anode materials 8 and 9, series connection of the cells is made possible. The contacts for the outer electric circuit are formed by metal plates 11 provided with nipples 12 for the gas inlets and outlets.

As the electrolyte elements are polished before the electrodes are applied, the large contact faces provided by the assembly of several cell aggregates ensure a sufficient seal and at the same time provide for the series connection.

Similarly, cell aggregates as shown in FIGS. 1 and 3 can be assembled to series-connected systems.

EXAMPLE 5

Figure 6:
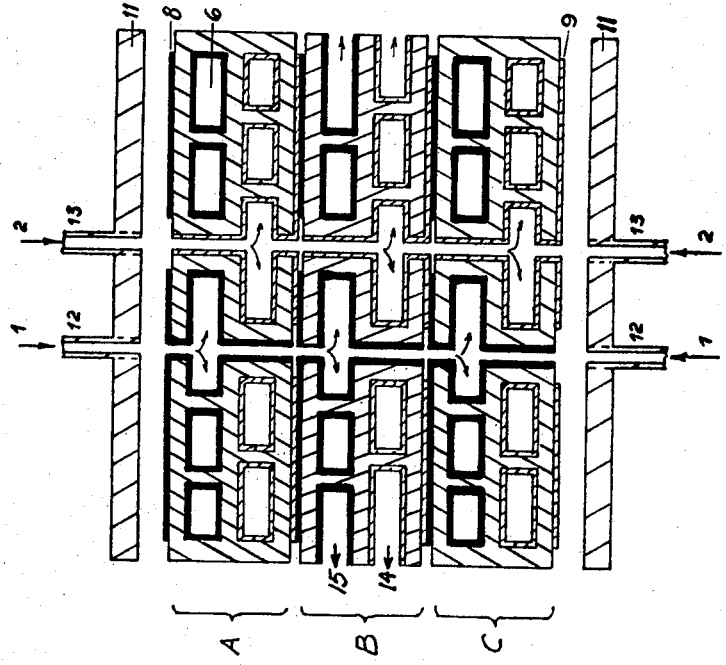

An interesting embodiment of a series connection is obtained by combining elements of FIGS. 1 and 3. In this way, a system is obtained where at certain places, by using the construction elements of FIG. 1, the combustion products are drawn off into the waste gas room surrounding the cells. This principle is illustrated in FIG. 6. Fuel gas and oxidant gas, which flow at 1 and 2 into the construction elements A and C, are there essentially converted electrochemically. The residual conversion takes place in construction element B. The combustion products are then blown into the waste gas space at 15 and 14. Also in this assembly, the contacts for the external electric circuit are formed by metallic front plates 11 which carry the gas supply tubes 1 and 2.

In order to render the fuel cell aggregates operative, they must be heated to the operational temperatures. For this purpose, it is of advantage to pass the gases first through the multilayer electrolyte and to ignite them in the surrounding waste gas space. The heat thus developed suffices to heat the element to the required operational temperature.

We claim:

1. An aggregate of galvanic fuel cells for operation with a gas fuel and a gas oxidant at elevated temperatures comprising a plurality of closely spaced superposed solid electrolyte disc-shaped layers, each disc-shaped layer being provided at each side with a thin layer gas-permeable electrode, a plurality of stays of the same material as said electrolyte, said stays supporting and spacing said disc-shaped layers and forming therewith a unitary structure having gas-tight chambers between said disc-shaped layers, said disc-shaped layers having a thickness of about 0.1 to 1 mm. and said stays having a height of about 0.1 to 2 mm., means for introducing the gas fuel to alternate ones of said chambers, and means for introducing the gas oxidant to chambers disposed between said alternate chambers.

2. The invention as recited in claim 1 wherein said means for introducing the gas fuel includes a bore through said disc-shaped layers, said bore communicating with said alternate chambers.

3. The invention as recited in claim 1 and further including a waste gas space communicating with said alternate chambers and said chambers disposed between said alternate chambers.

4. The invention as recited in claim 2 wherein said means for introducing the gas oxidant includes a second bore through said disc-shaped layers, said second bore communicating with said chambers disposed between said alternate chambers.

References Cited

UNITED STATES PATENTS

| | | | |
|---|---|---|---|
| 409,366 | 8/1889 | Mond et al. | 136—86 |
| 2,175,523 | 10/1939 | Greger | 136—86 |
| 3,235,407 | 2/1966 | Nicholson et al. | 136—86 |

WINSTON A. DOUGLAS, Primary Examiner

H. A. FEELEY, Assistant Examiner